United States Patent [19]

Hirooka et al.

[11] Patent Number: 5,122,164
[45] Date of Patent: Jun. 16, 1992

[54] PROCESS FOR PRODUCING OXYGEN ENRICHED PRODUCT STREAM

[75] Inventors: Eiji Hirooka, Osaka, Japan; Jeremy P. Wheatland, Guildford, England; Shain-Jer Doong, Berkeley Heights, N.J.

[73] Assignee: The BOC Group, Inc., Murray Hill, N.J.

[21] Appl. No.: 724,672

[22] Filed: Jul. 2, 1991

Related U.S. Application Data

[63] Continuation-in-part of Ser. No. 501,456, Mar. 29, 1990, abandoned.

[51] Int. Cl.$^5$ ............................................. B01D 53/04
[52] U.S. Cl. ............................................. 55/26; 55/58; 55/62; 55/68; 55/75; 55/162; 55/179; 55/389
[58] Field of Search ............... 55/25, 26, 58, 62, 68, 55/75, 161–163, 179, 180, 389

[56] References Cited

U.S. PATENT DOCUMENTS

| | | | |
|---|---|---|---|
| 2,944,627 | 7/1960 | Skarstrom | 55/62 X |
| 3,313,091 | 4/1967 | Berlin | 55/62 X |
| 3,636,679 | 1/1972 | Batta | 55/62 X |
| 3,738,087 | 6/1973 | McCombs | 55/58 |
| 3,923,477 | 12/1975 | Armond et al. | 55/25 |
| 4,065,272 | 12/1977 | Armond | 55/25 |
| 4,144,037 | 3/1979 | Armond et al. | 55/58 |
| 4,194,891 | 3/1980 | Earls et al. | 55/58 X |
| 4,194,892 | 3/1980 | Jones et al. | 55/58 |
| 4,406,675 | 9/1983 | Dangieri et al. | 55/26 |
| 4,781,735 | 11/1988 | Tagawa et al. | 55/26 |
| 4,810,265 | 3/1989 | Lagree et al. | 55/26 |
| 4,917,710 | 4/1990 | Haruna et al. | 55/26 |
| 4,925,461 | 5/1990 | Gemba et al. | 55/26 |

Primary Examiner—Robert Spitzer
Attorney, Agent, or Firm—Robert I. Pearlman; Coleman R. Reap

[57] ABSTRACT

A two bed pressure swing adsorption process is disclosed having high yield and high production rate. The process utilizes fine or normal size zeolite sieve material and relatively short cycle times. A power saving can be obtained by sequencing the various steps of the process to provide substantially continuous use of a vacuum pump.

25 Claims, 4 Drawing Sheets

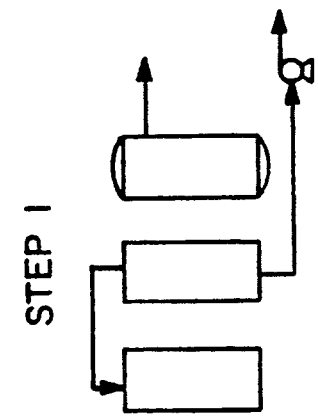
FIG.2A STEP 1
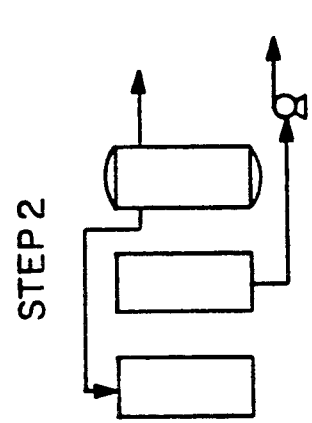
FIG.2B STEP 2
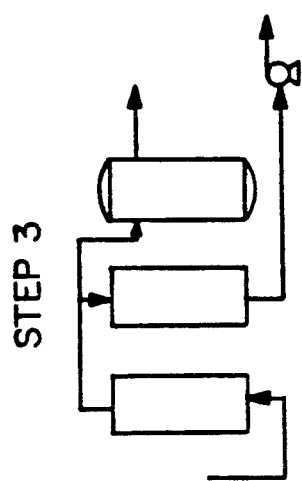
FIG.2C STEP 3
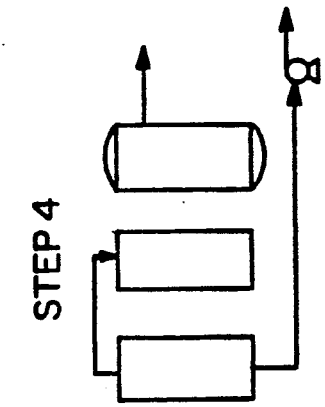
FIG.2D STEP 4
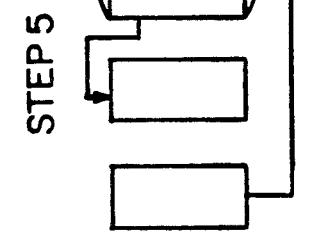
FIG.2E STEP 5
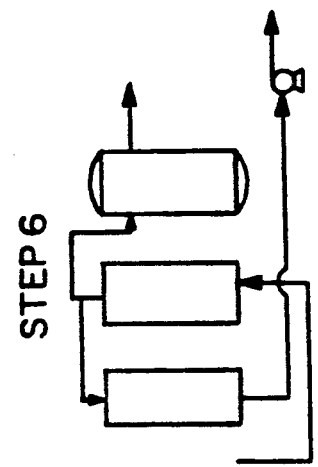
FIG.2F STEP 6

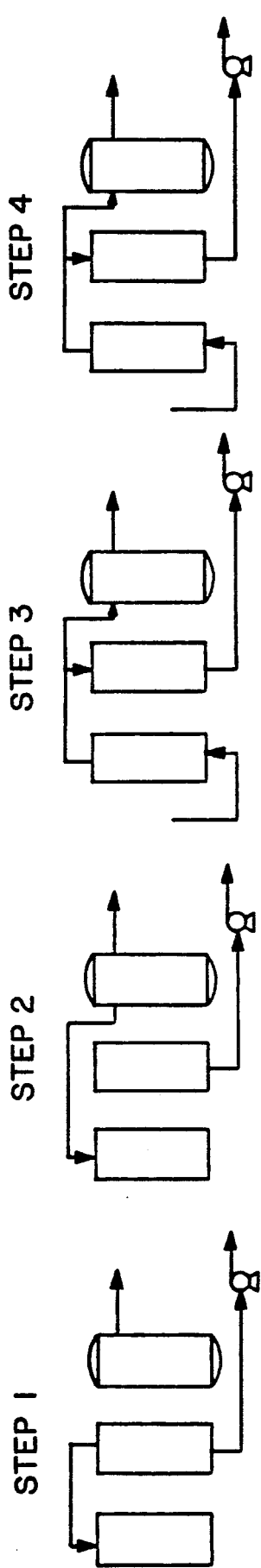
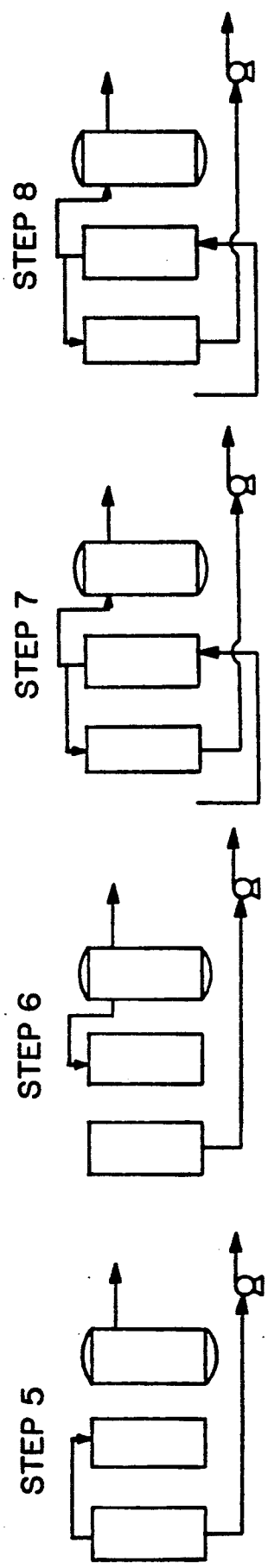

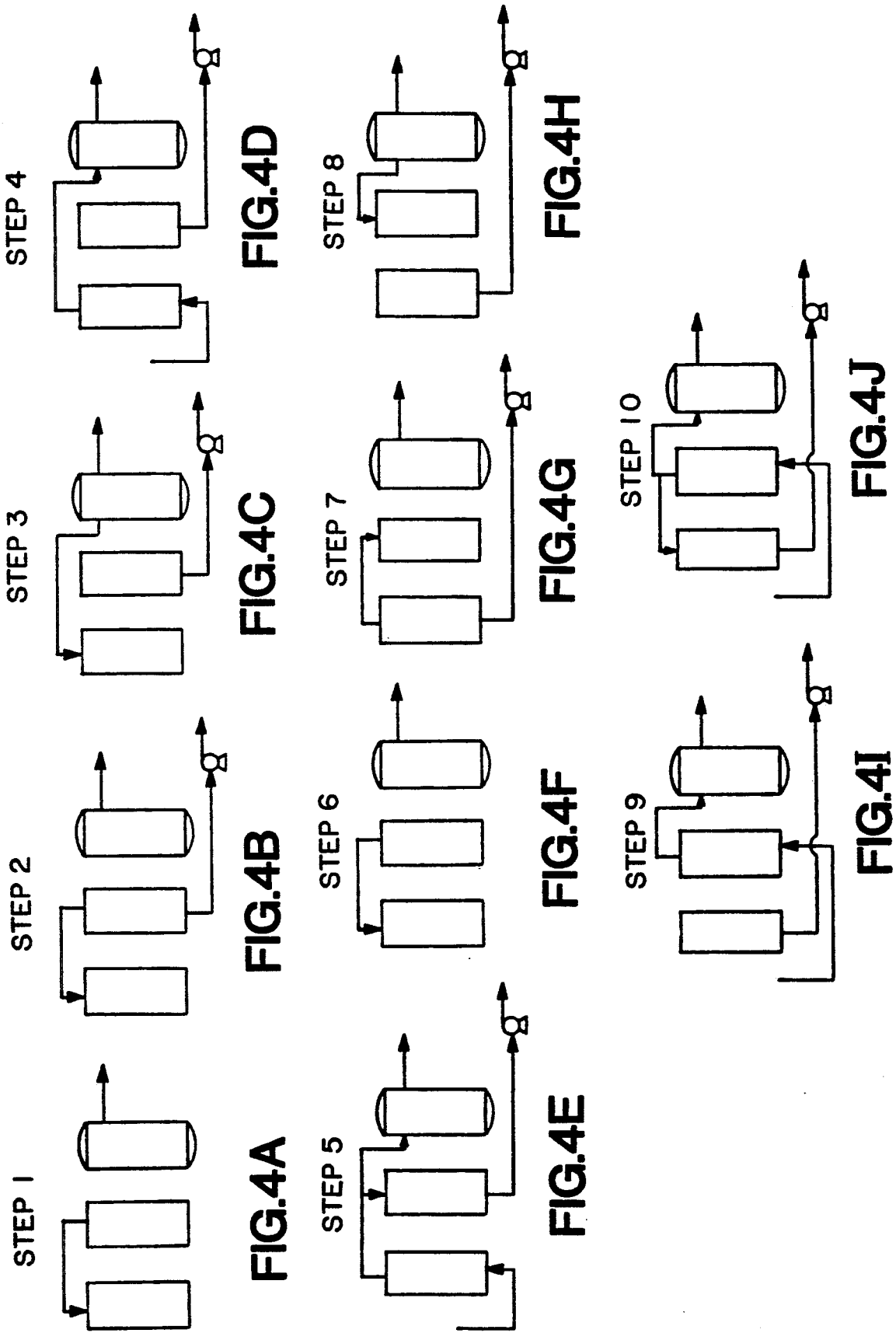

PROCESS FOR PRODUCING OXYGEN ENRICHED PRODUCT STREAM

This is a continuation-in-part of application, Ser. No. 07/501,456, filed 29 Mar. 1990, and now abandoned.

BACKGROUND OF THE INVENTION

This invention relates to a process for obtaining an oxygen enriched gas from a mixed gas containing principally oxygen and nitrogen as gas components, such as air, by means of pressure swing adsorption (PSA).

Pressure swing adsorption systems and process have been widely used to produce oxygen enriched streams from mixed gases, including air, and a multitude of such systems and processes have been utilized.

It is advantageous, in such systems, to utilize a relatively short time cycle for carrying out the process inasmuch as shorter times obtain good utilization of the sieve material used to adsorb one of the components. The short cycle times generally employ a finer particle size of sieve material to reduce diffusive resistance. Typical examples of short cycle times are shown and described in U.S. Pat. Nos. 4,194,891 and 4,194,892. Oxygen production increased with the process in the aforementioned patents however the yield was fairly low. e.g., 10–20% yields.

Conventional vacuum PSA processes do produce a higher oxygen yield (50–60%) however the production rate is somewhat low. The normal production rate of conventional three bed PSA processes is not particularly high; as an example, typically, the bed size factor is about 2000–2600 kg of zeolite per metric ton of oxygen produced per day.

Optimally, one would obviously like to obtain the high production rate typified by faster cycle times and finer sieve particles along with the high yield typlified by conventional three bed systems yet have a process that is inexpensive and relatively simple in operation.

SUMMARY OF THE INVENTION

The PSA process of the present invention achieves an enriched oxygen product that has a high oxygen yield as well as high production rate by solving the disadvantages of the prior art while minimizing cost and maintaining simplicity of operation.

The system uses short cycle times to gain good usage of the sieve material but requires only two beds, thus greatly simplifying the prior three-bed processes that heretofore were needed for high yields.

As will be shown, one of the further features is the power saving by continuous or nearly continuous utilization of a vacuum pump with a two adsorption column system. This is accomplished by carrying out part or all of the equalization procedure, during which an oxygen-enriched stream from the outlet end of a first column is supplied to the outlet end of a second column, while desorbing nitrogen rich gas from the inlet end of the first column. By this means, the vacuum pump is run during at least part of the equalization procedure as well as during the remaining steps. Since the vacuum pump is running continuously or almost continuously during the overall cycle, its use, and thus its power consumption, is optimized.

Thus, the two bed PSA process having high yield and production rate is achieved using relatively, fine particles of zeolite sieve material, such as 20–35 mesh size and even with larger particles such as 8–12 mesh size at short cycle times less than 40 seconds, preferably about 25–30 seconds. The range of pressure swing uses vacuum of less than 300 torr and preferably to 200 torr for desorption and maximum product pressure less than 5 psig and preferably less than 3 psig.

In a first embodiment of the invention the process is carried out in a total of six steps per each complete cycle. In steps one to three the first column is continuously evacuated by means of a vacuum pump and in steps four to six the second column is evacuated with the vacuum pump. Thus, in this embodiment the vacuum pump is utilized throughout the entire cycle. In steps one and four, which are pressure equalization steps, gas is passed from the column undergoing evacuation to the other column; in steps two and five, the column not undergoing evacuation receives backfill gas from the product reservoir; and in steps three and six, the column not undergoing evacuation receives feed gas and produces product while product gas is used to purge the column undergoing evacuation.

In a second embodiment of the invention the process is carried out in a total of eight steps per each complete cycle. In steps one to four the first column is continuously evacuated by means of a vacuum pump and in steps five to eight the second column is continuously evacuated with the vacuum pump. Accordingly, in this embodiment also, the vacuum pump is utilized throughout the entire cycle. In steps one and five, which are pressure equalization steps, gas is passed from the column undergoing evacuation to the other column; in steps two and six, the column not undergoing evacuation receives backfill gas from the product reservoir; in steps three and seven, the column not undergoing evacuation receives feed gas and produces product; and in steps four and eight the column not undergoing evacuation continues to receive feed gas and produce product while product gas is used to purge the column undergoing evacuation. In other words, the cycle of this embodiment is identical to the cycle of the first embodiment except that this embodiment contains a step in which the column not undergoing evacuation produces product while the other column undergoes evacuation without purge. The cycle of this embodiment is more efficient than the cycle of the first embodiment.

In a third embodiment of the invention the process is carried out in a total of ten steps per each complete cycle. In steps two to five the first column is continuously evacuated by means of a vacuum pump and in steps seven to ten the second column is continuously evacuated with the vacuum pump. Thus, in this embodiment the vacuum pump is utilized during eight of the ten steps of the operating cycle. In steps one and six, which are pressure equalization steps, gas is passed from the column which has just completed production to the other column; in steps two and seven, which are also pressure equalization steps, gas is passed from the column undergoing evacuation to the other column; in steps three and eight, the column not undergoing evacuation receives backfill gas from the product reservoir; in steps four and nine, the column not undergoing evacuation receives feed gas and produces product; and in steps five and ten the column not undergoing evacuation continues to receive feed gas and produce product while product gas is used to purge the column undergoing evacuation. Thus, the cycle of this embodiment is identical to the cycle of the second embodiment except that this embodiment contains an equalization step without evacuation. The advantage of this embodiment is that there is less disturbance of the bed that provides gas during the equalization procedure since this bed does not undergo depressurization from both ends during the early part of the equalization procedure when the pressure differential between the beds is at a maximum.

BRIEF DESCRIPTION OF THE DRAWINGS

FIGS. 2A-2F illustrate a column cycle of a first embodiment of the present invention;

FIGS. 3A-3H illustrate a column cycle of a second embodiment of the invention; and FIGS. 4A-4J illustrate a column cycle of a third embodiment of the invention.

DESCRIPTION OF THE PREFERRED EMBODIMENT

Figure 1:
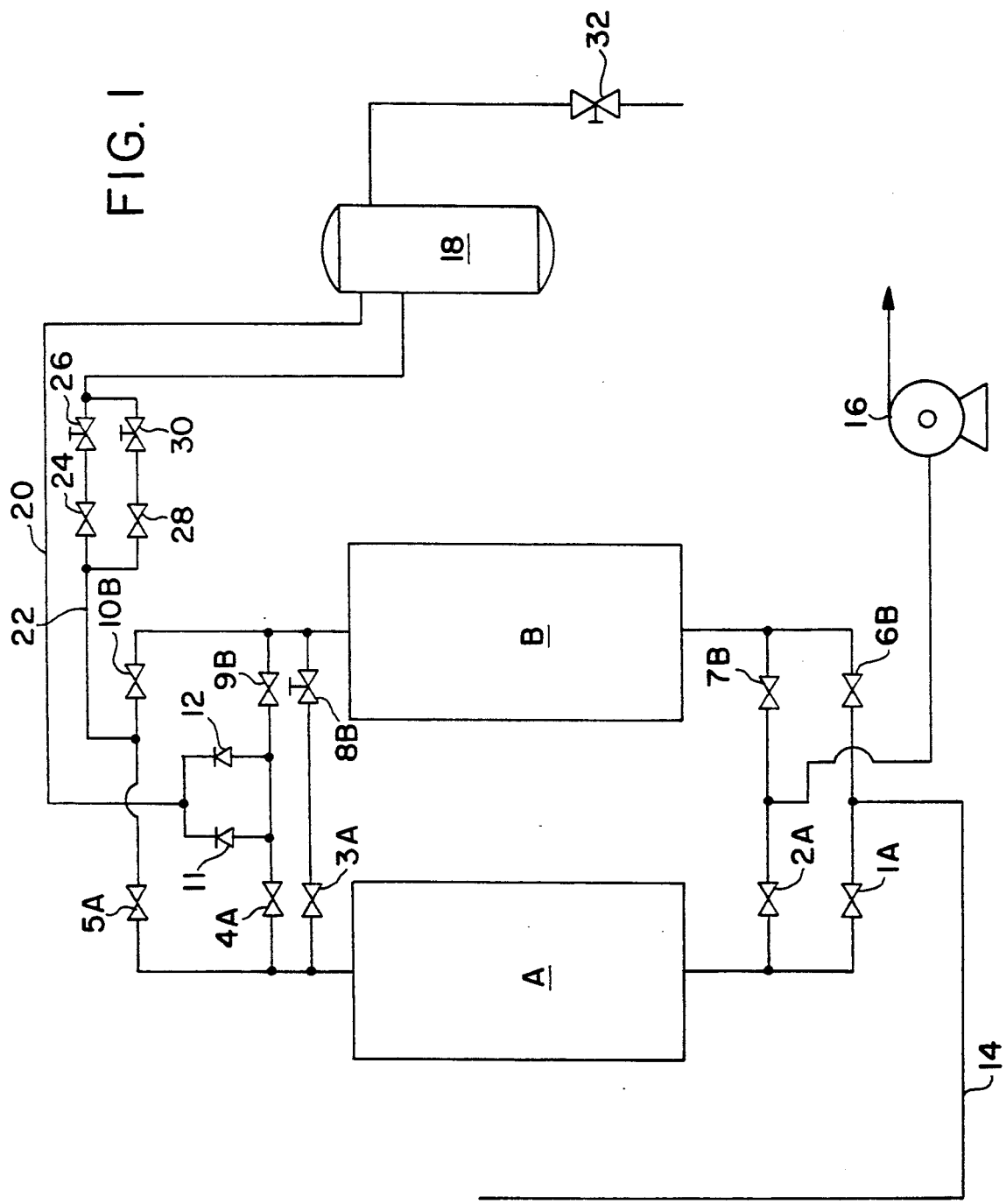
FIG. 1 is a schematic flow diagram of the present invention.

The cycle of the first embodiment of the present invention will specifically be described with reference to the schematic flow diagram shown on FIG. 1 and the column cycle of FIG. 2.

Considering first FIGS. 1 and 2A-2F, there is shown a system for producing an enriched oxygen gas stream continuously generated from a gas containing principally oxygen and nitrogen, such as air. Each of the two adsorption columns A and B contains an adsorbent capable of selectively adsorbing nitrogen.

In all process embodiments of the invention the adsorption columns are packed with relatively fine particles of zeolite, i.e. about 8-35 mesh and preferably about 12-20 mesh. Typical zeolite sieve material is available in the form of beads or pellets from various zeolite manufacturers. Control of each of the steps of the process, embodiments can be regulated by conventional means, e.g., a timer to control solenoid operated valves of standard commercial design.

In step 1 of the first embodiment (shown in FIG. 2A), valves 1A and 2A are closed, thereby closing off the lower or inlet end of the first column A. At the top, or outlet end, of column A, valves 4A and 5A are closed and valve 3A is open. With respect to the second column B, valves 9B and 10B are closed; thus gas from the outlet of column B is being introduced into the outlet of column A through valve 3A and the flow is controlled by valve 8B. At the same time in Step 1, at the inlet end of column B valve 6B is closed but valve 7B is open; thus gas is being withdrawn from the inlet end of column B by means of vacuum pump 16.

During this step, the pressure in column B, which is initially higher than the pressure in column A, is used to substantially equalize the pressures in both columns. That is, column B may, at the beginning of step 1, be at a positive pressure of about 1010 torr (4.84 psig) and is reduced to about 500 torr (−5.03 psig) by the end of step 1, while column A commences step 1 at a pressure of about 200 torr (−10.83 psig) and the pressure is raised to 470 torr (−5.61 psig). At the end of step 1, therefore, the column pressures are essentially equalized. Step 1 may take place extremely rapidly, preferably in about 2 seconds to 6 seconds and more preferably in about 4 seconds.

In Step 2, valve 3A is closed and valve 5A and valve 24 opened and oxygen enriched product gas from the reservoir 18 is introduced into the outlet of column A and is controlled by metering valve 26 to backfill column A and to raise the pressure further in column A. Typically, since the pressure in product reservoir is about 800 torr, the pressure within column A continues to increase from 470 torr (−5.61 psig) to about 660 torr (−1.93 psig). At the same time, gas is still being withdrawn from the inlet of column B through open valve 7B by vacuum pump 16 and the pressure within column B continues to decrease. That pressure may decrease, in step 2, from 500 torr (−5.03 psig) to about 450 torr (−6.00 psig). Again, the timing of step 2 is extremely rapid, preferably being completed in about 1 to 5 seconds, and more preferably in about 3 seconds.

In step 3, valve 1A is open, and air or other feed gas containing principally oxygen and nitrogen under a predetermined feed pressure is introduced to the inlet of column A through line 14. Inlet pressures may vary but the inlet pressure ideally has a minimum predetermined pressure of between 3 and 7 psig, and more preferably has a minimum value of about 5 psig. At the outlet of column A, valve 5A is closed and valve 4A is opened. Thus the feed air passes through column A where nitrogen is adsorbed and an oxygen enriched product stream passes from the outlet end of column A, through valve 4A, check valve 11 and through line 20 to the product reservoir 18. During this step, the pressure in column A may increase from 660 torr (−1.93 psig) to about 1010 torr (4.84 psig) in producing oxygen enriched product. At the same time, in step 3, gas continues to be withdrawn from the inlet end of column B to desorb or evacuate nitrogen enriched gas from column B by means of vacuum pump 16. Simultaneously with the desorption of column B via its inlet, valves 10B and 24 are open and oxygen enriched product stream is introduced into the outlet of column B to purge column B. The flow of the oxygen enriched product stream is controlled by metering valve 26. Thus, column B is both purged by an oxygen enriched stream of gas introduced into its outlet and desorbed by withdrawing nitrogen rich gas from its inlet. The pressure in column B thus continues to decrease, typically from about 450 torr (−6.10 psig) to about 200 torr (−10.83 psig) as the withdrawal by means of vacuum pump 16 continues uninterrupted. Step 3 is also carried out quite rapidly, in a range of cycle time preferably of about 10 seconds to 25 seconds and more preferably about 18 seconds.

Continuing on to step 4, equalization again takes place, this time by introducing the now higher pressure gas of column A into column B. This is carried out by closing valve 4A at the outlet of column A and opening valve 3A. At the outlet of column B, valve 10B is closed and thus, gas passes from column A to column B for equalization of pressures controlled by metering valve 8B. At the same time, of course, the feed stream is cut off by closing valve 1A at the inlet to column A and valve 2A is opened so that gas can be withdrawn from the inlet end of column A through vacuum pump 16. The inlet of column B is closed completely by closing valve 7B.

In step 4, therefore, the pressures within column A and B are approximately equalized, the pressure in column A is reduced from about 1010 torr (4.84 psig) to about 500 torr (−5.03 psig) while the pressure in column B is increased from about 200 torr (−10.83 psig) to about 470 torr (−5.61 psig). Step 4 is carried out preferably in a time of from about 2 to about 6 seconds, and more preferably in about 4 seconds.

In step 5, valve 3A is closed, thus closing entirely the outlet end of column A while gas continues to be withdrawn from the inlet end of column A drawing the pressure down, typically, from 500 torr (−5.03 psig) to 450 torr (−6.00 psig). Valves 10B and 28 are opened and oxygen enriched product from product reservoir 18 enters column B to backfill that column controlled by metering valve 30 such that the pressure in column B is increased from, typically, about 470 torr (−5.61 psig) to about 660 torr (−1.93 psig). Again, as in step 2, the backfilling step takes place in about 1 to 5 seconds, and preferably in about 3 seconds.

Finally, in step 6, valve 6B is opened, thus introducing the pressurized feed stream into the inlet of column B. Valve 9B is opened so that the oxygen enriched product stream from column B passes through check valve 12 and continues via line 20 to product reservoir 18.

During step 6, valves 24 and 5A are open thereby allowing oxygen enriched gas to enter the outlet of column A to purge column A, controlled by metering valve 26. Simultaneously with the purging of column A, gas continues to be withdrawn from the inlet of column A by vacuum pump 16 to desorb or evacuate nitrogen rich gas. Typically, again, the pressure within column A decreases from about 450 torr (−6.00 psig) to about 200 torr (−10.83 psig) while the pressure in column B increases from about 660 torr (−1.93 psig) to about 1010 torr (4.84 psig). The timing of step 6 can be from about 10 to about 25 seconds and is preferably about 18 seconds.

At the completion of step 6, the entire sequence is repeated on a continual cyclic basis so that product is continuously taken from product reservoir 18 through valve 32 during each of the steps.

As can be seen, in this embodiment the vacuum pump 16 is continuously utilized to withdraw gas alternately from one or the other of the two columns, thus it is efficiently utilized to minimize power use throughout the cycle.

Turning now to FIG. 3, represented therein is a modification of the basic cycle illustrated in FIG. 2. Steps 1, 2, 5 and 6 of the cycle of FIG. 3 are identical to steps 1, 2, 4 and 5, respectively, of the cycle of FIG. 2. Step 3 of the cycle of FIG. 3 is similar to step 3 of the FIG. 2 cycle except that column B is not purged with product gas during step 3 of FIG. 3. Similarly, step 7 of the FIG. 3 cycle differs from step 6 of the FIG. 2 cycle in that column A is not purged during step 7 of the FIG. 3 cycle. This result is accomplished by keeping valves 10B and 24 closed during step 3 and valves 5A and 24 closed during step 7 of the FIG. 3 cycle.

Thus, in step 3 of the cycle of FIG. 3 valve 1A is open, and air or other feed gas containing principally oxygen and nitrogen under a predetermined feed pressure is introduced to the inlet of column A. The inlet pressure may vary but ideally has a minimum predetermined value of between 3 and 7 psig, and preferably has a minimum value of about 5 psig. At the outlet of column A, valve 5A is closed and valve 4A is open. The feed air passes through column A, where nitrogen is adsorbed, and an oxygen-enriched product stream passes from the outlet end of column A and through valve 4A, check valve 11 and line 20 to product reservoir 18. During this step, the pressure in column A may increase from about 660 torr (−1.93 psig) to about 900 torr (2.71 psig) in producing oxygen enriched product. During step 3, gas continues to be withdrawn from the inlet end of column B to desorb or evacuate nitrogen enriched gas from column B by means of vacuum pump 16. The pressure in column B thus continues to decrease, typically from about 450 torr (−6.00 psig) to about 210 torr (-10.64 psig) as the withdrawal by means of vacuum pump 16 continues uninterrupted. Step 3 is carried out very rapidly, in a range of cycle time preferably of about 8 seconds to 20 seconds and more preferably about 13 seconds.

Similarly, in step 7 of the cycle of FIG. 3 valve 6B is open, thus introducing feed gas into column A through its inlet. At the outlet of column B, valve 9B is open, thereby permitting oxygen-enriched product stream from column B to pass through check valve 12, line 20 and into product reservoir 18. During step 7 the pressure within column A decreases from about 450 torr (−6.00 psig) to about 210 torr (-10.64 psig) while the pressure in column B increases from about 660 torr (−1.93 psig) to about 900 torr (2.71 psig). The timing of step 7 can be from about 8 to about 20 seconds and is preferably about 13 seconds.

Steps 4 and 8 of the FIG. 3 cycle are identical to steps 3 and 6 of the FIG. 2 cycle, except that the duration of steps 4 and 8 of the cycle of FIG. 3 is shorter than that of steps 3 and 6 of the cycle of FIG. 2. Also, the initial pressure of the column being evacuated in steps 4 and 8 of the FIG. 3 cycle is lower than the initial pressure of the column being evacuated in steps 3 and 6 of the FIG. 2 cycle, due to the continuation of evacuation of the adsorbers in steps 3 and 7 of the cycle in FIG. 3.

Thus, in step 4 of the cycle of FIG. 3, valves 1A and 4A are open, thereby permitting oxygen enriched product produced in column A to pass through check valve 11 and line 20 and to enter product reservoir 18, and in step 8, valves 6B and 9B are open, thereby permitting oxygen enriched product produced in column B to pass through check valve 12 and line 20 to product reservoir 18. Also during step 4, valves 7B, 10B and 24 are open, thereby allowing oxygen enriched gas to purge column B and permitting vacuum pump 16 to continue to evacuate column B. During step 8, valves 2A, 5A and 24 are also open, thereby allowing oxygen-enriched gas to purge column A and permitting vacuum pump 16 to continue to evacuate column A.

During step 4 the pressure within column B decreases from about 210 torr (−10.64 psig) to about 200 torr (−10.83 psig) while the pressure in column A increases from about 900 torr (2.71 psig) to about 1010 torr (4.84 psig). Similarly, during step 8, the pressure within column A decreases from about 210 torr (−10.64 psig) to about 200 torr (−10.83 psig) while the pressure in column B increases from about 900 torr (2.71 psig) to about 1010 torr (4.84 psig). The timing of steps 4 and 8 can be from about 5 to about 15 seconds and is preferably about 10 seconds.

From the above it can be seen that the total cycle time for this embodiment is usually in the range of about 16 to about 46 seconds. In a preferred embodiment the total time for the eight step cycle is less than about 40 seconds and is most preferably about 30 seconds.

In this embodiment also, the vacuum pump 16 is continuously utilized to withdraw gas alternately from one or the other of the two columns, thus it is efficiently utilized to minimize power use throughout the cycle.

Turning now to FIG. 4, represented therein is a modification of the basic cycle illustrated in FIG. 3. Steps 3, 4, 5, 8, 9 and 10 of the cycle of FIG. 4 are identical to steps 2, 3, 4, 6, 7 and 8 respectively, of the cycle of FIG. 3. Step 1 of the cycle of FIG. 4 differs from step 1 of the FIG. 3 cycle in that column B is not evacuated during step 1 of the cycle of FIG. 4. Similarly, step 6 of the FIG. 4 cycle differs from step 5 of the FIG. 3 cycle in that column A is not evacuated during step 6 of the FIG. 4 cycle. This result is accomplished by keeping valve 7B closed during step 1 of the FIG. 4 cycle and valve 2A closed during step 6 of the FIG. 4 cycle. Steps 2 and 7 of the FIG. 4 cycle differ from steps 1 and 5 of the FIG. 3 cycle only in that duration of these steps and the pressures at the beginning of these steps are not the same.

In step 1 of the cycle of FIG. 4 valve 3A is open and all other valves (except valve 32) are closed. During this step gas will pass from column B to column A. Also during this step, the pressure in column A typically increases from about 200 torr (−10.83 psig) to about 400 torr (−6.96 psig) while the pressure in column B decreases from about 1010 torr (4.84 psig) to about 750 torr −0.19 psig). Step 1 is carried out very rapidly, preferably in a cycle time range of about 2 to 6 seconds and more preferably in a cycle time of about 4 seconds.

Similarly, in step 6 of the cycle of FIG. 4 valve 3A is open and all other valves (except valve 32) are closed. During this step gas will pass from column A to column B and the pressure in column B typically increases from about 200 torr (−10.83) psig) to about 400 torr (−6.96 psig) while the pressure in column A decreases from about 1010 torr (4.84 psig) to about 750 torr (−0.19 psig). Step 6 is likewise preferably carried out in a cycle time range of about 2 to 6 seconds and more preferably in a cycle time of about 4 seconds.

Steps 2 and 7 of the FIG. 4 cycle are identical to steps 1 and 5 of the FIG. 3 cycle, except that the preferred duration of steps 2 and 7 of the cycle of FIG. 3 is shorter than the preferred duration of steps 1 and 5 of the cycle of FIG. 3 and the initial pressure of the column being evacuated in steps 2 and 7 of the FIG. 4 cycle is lower than the initial pressure of the column being evacuated in steps 1 and 5 of the FIG. 3 cycle, due to the transfer of gas during steps 1 and 6 from the column that has just completed production to the column that has just completed regeneration.

During step 1 of the cycle of FIG. 4, the pressure in column B decreases from about 1010 torr (4.84 psig) to about 750 torr (−0.19 psig) while the pressure in column A increases from about 200 torr (−10.83 psig) to about 400 torr (−6.96 psig). Similarly, during step 6, the pressure within column A decreases from about 1010 torr (4.84 psig) to about 750 torr (−0.19 psig) while the pressure in column B increases from about 200 torr (−10.83 psig) to about 400 torr (−6.96 psig). The timing of steps 1 and 6 can be from about 2 to about 6 seconds and is preferably about 4 seconds.

During step 2 of the cycle of FIG. 4, the pressure within column B decreases from about 750 torr (−0.19 psig) to about 500 torr (−5.03 psig) while the pressure in column A increases from about 400 torr (−6.96 psig) to about 470 torr (−5.61 psig). Similarly, during step 7, the pressure within column A decreases from about 750 torr (−0.19 psig) to about 500 torr (−5.03 psig) while the pressure in column B increases from about 400 torr (−6.96 psig) to about 470 torr (−5.61 psig). The timing of steps 2 and 7 can be from about 1 to about 5 seconds and is preferably about 3 seconds.

In this embodiment, the vacuum pump 16 is continuously utilized to withdraw gas alternately from one or the other of the two columns during eight out of the ten steps of this cycle. Thus it is efficiently utilized to minimize power use throughout most of the cycle. During the steps when the vacuum pump is not utilized to evacuate the columns it can continue to be operated, if desired, by supplying air to the pump.

From the above it can be seen that the total cycle time for this embodiment is usually in the range of about 17 to about 51 seconds. In a preferred embodiment the total time for the ten step cycle is less than about 40 seconds and is ideally about 30 seconds.

The invention is further illustrated in the following examples in which, unless otherwise indicated, parts percentages and ratios are on a volume basis.

EXAMPLE 1

Using the apparatus illustrated in FIG. 1 and the sequence of steps illustrated in FIG. 2, the process of the invention was conducted to obtain an oxygen-enriched product stream. Two adsorption columns, A and B, each 2 inches in diameter and 15 inches in height were packed with Calcium X zeolite molecular sieve material in the form of 0.4–0.8 mm beads commercially available from Laporte Co. for runs 1-3 (TABLE 1) and zeolite material in the form of 1.5 mm pellets from Tosoh Company (Tosoh Zeolum SA) for run 4. The pressure swing range during the cycle was 3.5 psig to 200 torr.

The cycle times, production rates and yields obtained are tabulated in TABLE 1.

TABLE 1

| Run | 1 | 2 | 3 | 4 |
|---|---|---|---|---|
| Cycle times (second) | 25 | 20 | 17 | 25 |
| Oxygen purity (%) | 93 | 93 | 93 | 93 |
| Bulk density (kg/cm3) | 681 | 681 | 681 | 620 |
| Oxygen yield (%) | 59 | 58 | 56 | 55 |
| specific product (standard liter/hr of produced oxygen/liter of bed) | 40 | 51 | 59 | 40 |
| Bed size factor (kg zeolite per metric tons of oxygen per day) | 535 | 420 | 375 | 487 |

From the above test, it can be seen that a high yield and a high production rate at a high purity can be achieved by a two column system wherein vacuum is continuously applied to one or the other of the columns during each of the steps. Thus, the vacuum pump is efficiently used and power conserved. The cycles are extremely rapid to achieve good utilization of the sieve material, yet the construction and operation of the two bed system is obviously more advantageous than the more complex, more expensive three bed systems.

EXAMPLE 2

Using the apparatus illustrated in FIG. 1 and the sequence of steps illustrated in FIG. 3, the process of the invention was conducted to obtain an oxygen-enriched product stream. Adsorption columns A and B had diameters of 24 inches and were 4 feet long. The columns were packed with 25 inches of Tosoh SA500 sieve and 6 inches of alumina, with the alumina placed at the inlet end of the columns to adsorb moisture. The duration of the run was sufficient to establish steady state.

The cycle times, production rates and yields obtained are tabulated in TABLE 2.

TABLE 2

| Steps | Duration, secs. |
|---|---|
| 1 and 5 | 4 |
| 2 and 6 | 3 |
| 3 and 7 | 13 |
| 4 and 8 | 10 |

TABLE 2-continued

| Steps | Duration, secs. |
|---|---|
| Total cycle time | 30 |
| Product purity (% oxygen) | 93.1 |
| Yield (%) | 44.7 |
| Specific Product (Nm³/hr product/ m³ of sieve) | 40.1 |

As shown in TABLE 2 a high product purity and good yield are obtained when using the cycle of this embodiment of the invention.

EXAMPLE 3

Using the apparatus illustrated in FIG. 1 and the sequence of steps illustrated in FIG. 4, the process of the invention was conducted to obtain an oxygen-enriched product stream. Adsorption columns A and B had inside diameters of 4.3 cm. and were 1.8 meters long. The columns were packed to a height of about 1.7 meters with Tosoh SA500 sieve. In this example a preliminary guard bed packed with about 30 cm. of alumina was used with each column to adsorb moisture. To determine if the bed experiences disturbance during the cycle the top surface of the adsorbent bed was sprayed with paint prior to the experiment. The surface of the bed was examined after completion of the experiment to see if the paint layer was intact. A disrupted surface indicates disturbance of the bed.

The cycle times, production rates and yields obtained are tabulated in TABLE 3.

TABLE 3

| Steps | Duration, secs. |
|---|---|
| 1 and 6 | 4 |
| 2 and 7 | 3 |
| 3 and 8 | 3 |
| 4 and 9 | 10 |
| 5 and 10 | 10 |
| Total cycle time | 30 |
| Product purity (% oxygen) | 93 |
| Yield (%) | 49.2 |
| Specific Product (Nm³/hr product/ m³ of sieve) | 41 |

As can be seen, good performance results were obtained. The surface of the bed was examined and found to be undisturbed, indicating that no movement of the adsorbent bed occurred. When the same test was performed without using steps 1 and 6 some disturbance of the bed was detected. Thus, the ten step cycle of the invention presents an additional advantage.

While particular embodiments of the invention have been shown, it should be understood that the invention is not limited thereto, since modifications may be made, and it is contemplated to cover such modifications as fall within the spirit and scope of the appended claims.

We claim:

1. A process for producing an oxygen enriched product stream from a feed gas containing at least oxygen and nitrogen utilizing two adsorption columns containing an adsorbent capable of selective adsorption of nitrogen and a product reservoir comprising the steps of:

(i) introducing gas into the outlet of a first adsorption column at a low pressure from the outlet of a second adsorption column at a higher pressure to substantially equalize the pressures in the columns while withdrawing gas from the inlet of the second column;

(ii) after equalization of step (i), introducing product gas contained within the product reservoir at a higher pressure into the outlet of the first column to backfill the first column while continuing to withdraw gas from the inlet of the second column;

(iii) introducing feed gas into the inlet of the first column at a predetermined pressure and recovering the product of enriched oxygen gas from the outlet of the first column to introduce said enriched oxygen stream to the product reservoir, while introducing a portion of the product stream to the outlet of the second column to purge the second column and simultaneously withdrawing gas from the inlet of the second column to desorb and evacuate nitrogen rich gas from the second column;

(iv) introducing gas into the outlet of the second column from the outlet of the first column at an initially high pressure to substantially equalize the pressure in the columns while withdrawing gas from the inlet of the first column;

(v) after equalization of step (iv), introducing oxygen enriched product gas contained within the product reservoir at a higher pressure into the outlet of the second column while continuing to withdraw gas from the inlet of the first column;

(vi) introducing feed gas into the inlet of the second column at said predetermined pressure and recovering the product of enriched oxygen gas from the outlet of the second column to introduce said enriched oxygen stream to the product reservoir while introducing a portion of the product stream to the outlet of the first column to purge the first column while simultaneously withdrawing gas from the inlet of the first column to desorb and evacuate nitrogen rich gas from the first column; and (vii) cyclically repeating steps (i) to (vi) while withdrawing oxygen enriched product gas from the product reservoir.

2. A process as defined in claim 1 wherein said feed gas is air at a pressure of from about 3 to about 7 psig and said adsorbent is a zeolite of about 8-35 mesh.

3. A process as defined in claim 2 wherein said zeolite is in the form of beads or pellets having a size of between about 12 and about 20 mesh.

4. A process as defined in claim 1 wherein said steps (i) and (iv) take place in about 2 to 6 seconds; said steps (ii) and (v) take place in about 1 to 5 seconds; and said steps (iii) vi) take place in about 10 to 25 seconds.

5. A process as defined in claim 4 wherein said steps (i) and (iv) take place in about 4 seconds; said steps (ii) and (v) take place in about 3 seconds; and said steps (iii) and (vi) take place in about 18 seconds.

6. A process as defined in claim 1 wherein said step (i) and (iv) include equalizing the pressures in the columns to a pressure of from about 470 to about 500 torr; said product gas in steps (ii) and (v) is introduced at a pressure of about 800 torr; and said feed gas is introduced in steps (iii) and (vi) at a pressure of from about 3 to 7 psig.

7. A process as defined in claim 6 wherein said feed gas is at a pressure of less than about 5 psig.

8. A process as defined in claim 1 wherein said steps (i) through (vi) are carried out in less than about 40 seconds.

9. A process for producing an oxygen enriched product stream from a feed gas containing at least oxygen and nitrogen utilizing two adsorption columns containing an adsorbent capable of selective adsorption of nitrogen and a product reservoir comprising the steps of:

(i) introducing gas into the outlet of a first adsorption column at a low pressure from the outlet of a second adsorption column at a higher pressure to substantially equalize the pressures in the columns while withdrawing gas from the inlet of the second column;

(ii) after equalization of step (i), introducing product gas contained within the product reservoir at a higher pressure into the outlet of the first column to backfill the first column while continuing to withdraw gas from the inlet of the second column;

(iii) introducing feed gas into the inlet of the first column at a predetermined pressure while withdrawing an enriched oxygen stream from the outlet of the first column and collecting said enriched oxygen stream in the product reservoir, and simultaneously withdrawing gas from the inlet of the second column to desorb and evacuate nitrogen rich gas from the second column;

(iv) introducing a portion of the product stream to the outlet of the second column to purge the second column while continuing to introduce feed gas into the inlet of the first column at said predetermined pressure, withdraw an enriched oxygen stream from the outlet of the first column, collect enriched oxygen gas in said product reservoir and simultaneously withdraw gas from the inlet of the second column to desorb and evacuate nitrogen rich gas from the second column;

(v) introducing gas into the outlet of the second column from the outlet of the first column at an initially high pressure to substantially equalize the pressure in the columns while withdrawing gas from the inlet of the first column;

(vi) after equalization of step (v), introducing oxygen enriched product gas contained within the product reservoir at a higher pressure into the outlet of the second column while continuing to withdraw gas from the inlet of the first column;

(vii) introducing feed gas into the inlet of the second column at a predetermined pressure while withdrawing an enriched oxygen stream from the outlet of the second column and collecting said enriched oxygen stream in the product reservoir, and simultaneously withdrawing gas from the inlet of the first column to desorb and evacuate nitrogen rich gas from the first column;

(viii) introducing a portion of the product stream to the outlet of the first column to purge the first column while continuing to introduce feed gas into the inlet of the second column at said predetermined pressure, withdraw an enriched oxygen stream from the outlet of the second column, collect enriched oxygen gas in said product reservoir and simultaneously withdraw gas from the inlet of the first column to desorb and evacuate nitrogen rich gas from the second column; and (ix) cyclically repeating steps (i) to (viii) while withdrawing oxygen enriched product gas from the product reservoir.

10. A process as defined in claim 9 wherein said feed gas is air at a pressure of from about 3 to about 7 psig and said adsorbent is a zeolite of about 8-35 mesh.

11. A process as defined in claim 10 wherein said zeolite is in the form of beads or pellets having a size of between about 12 and about 20 mesh.

12. A process as defined in claim 9 wherein steps (i) and (v) take place in about 2 to 6 seconds; steps (ii) and (vi) take place in about 1 to 5 seconds; steps (iii) and (vii) take place in about 8 to 20 seconds; and steps (iv) and (viii) take place in about 5 to 15 seconds.

13. A process as defined in claim 12 wherein steps (i) and (v) take place in about 4 seconds; steps (ii) and (vi) take place in about 3 seconds; steps (iii) and (vii) take place in about 3 seconds; and steps (iv) and (viii) take place in about 10 seconds.

14. A process as defined in claim 13 wherein said feed gas is at a pressure of less than about 5 psig.

15. A process as defined in claim 9 wherein said steps (i) through (viii) are carried out in less than about 40 seconds.

16. A process for producing an oxygen enriched product stream from a feed gas containing at least oxygen and nitrogen utilizing two adsorption columns containing an adsorbent capable of selective adsorption of nitrogen and a product reservoir comprising the steps of:

(i) introducing gas into the outlet of a first adsorption column at a low pressure from the outlet of a second adsorption column at a higher pressure;

(ii) continuing to introduce gas into the outlet of said first adsorption column from the outlet of said second adsorption column until the pressures in the two columms is substantially equalized, while simultaneously withdrawing gas from the inlet of the second column;

(iii) after equalization of step (ii), introducing product gas contained within the product reservoir at a higher pressure into the outlet of the first column to backfill the first column while continuing to withdraw gas from the inlet of the second column;

(iv) introducing feed gas into the inlet of the first column at a predetermined pressure while withdrawing an enriched oxygen stream from the outlet of the first column and collecting said enriched oxygen stream in the product reservoir, and simultaneously withdrawing gas from the inlet of the second column to desorb and evacuate nitrogen rich gas from the second column;

(v) introducing a portion of the product stream to the outlet of the second column to purge the second column while continuing to introduce feed gas into the inlet of the first column at said predetermined pressure, withdraw an enriched oxygen stream from the outlet of the first column, collect enriched oxygen gas in said product reservoir and withdraw gas from the inlet of the second column to desorb and evacuate nitrogen rich gas from the second column;

(vi) introducing gas into the outlet of the second adsorption column at a low pressure from the outlet of the first adsorption column at a higher pressure;

(vii) continuing to introduce gas into the outlet of said second adsorption column from the outlet of said first adsorption column until the pressures in the two columms is substantially equalized, while simultaneously withdrawing gas from the inlet of the first column;

(viii) after equalization of step (vii), introducing oxygen enriched product gas contained within the product reservoir at a higher pressure into the outlet of the second column while continuing to withdraw gas from the inlet of the first column;

(ix) introducing feed gas into the inlet of the second column at a predetermined pressure while withdrawing an enriched oxygen stream from the outlet of the second column and collecting said enriched oxygen stream in the product reservoir, and simultaneously withdrawing gas from the inlet of the first column to desorb and evacuate nitrogen rich gas from the first column;

(x) introducing a portion of the product stream to the outlet of the first column to purge the first column, while continuing to introduce feed gas into the inlet of the second column at said predetermined pressure, withdraw an enriched oxygen stream from the outlet of the second column, collect enriched oxygen gas in said product reservoir and withdraw gas from the inlet of the first column to desorb and evacuate nitrogen rich gas from the second column;

(xi) cyclically repeating steps (i) to (x) while withdrawing oxygen enriched product gas from the product reservoir.

17. A process as defined in claim 16 wherein said feed gas is air at a pressure of from about 3 to about 7 psig and said adsorbent is a zeolite of about 8-35 mesh.

18. A process as defined in claim 17 wherein said zeolite is in the form of beads or pellets having a size of between about 12 and about 20 mesh.

19. A process as defined in claim 16 wherein steps (i) and (vi) take place in about 2 to 6 seconds; said steps (ii) and (vii) take place in about 1 to 5 seconds; steps (iii) and (viii) take place in about 1 to 5 seconds; steps (iv) and (ix) take place in about 8 to 20 seconds; and steps (v) and (x) take place in about 5 to 15 seconds.

20. A process as defined in claim 19 wherein steps (i) and (v) take place in about 4 seconds; steps (ii) and (vi) take place in about 3 seconds; said steps (iii) and (vii) take place in about 3 seconds; steps (iv) and (ix) take place in about 10 seconds and steps (v) and (x) take place in about 10 seconds.

21. A process as defined in claim 20 wherein said feed gas is at a pressure of about 5 psig.

22. A process as defined in claim 16 wherein steps (i) through (x) are carried out in less than about 40 seconds.

23. A system for carrying out the continuous production of an oxygen-enriched stream of gas from a feed stream of air comprising:

(a) a pair of adsorption zones each having an inlet and outlet and containing a nitrogen adsorbing adsorbent and being programmed to operate out of phase such that one adsorption zone sequences through a series of steps consisting of pressure increase equalization, backfill and production, while the other adsorption zone synchronously sequences through a series of steps consisting of pressure decrease equalization, evacuation, and purging, respectively;

(b) oxygen-enriched gas collection means;

(c) feed gas means connected to the inlets of said absorption zones and programmed to provide a stream of air to the inlet of the adsorption zone undergoing adsorption for the duration of the production step;

(d) evacuation means connected to the inlets of said adsorption zones comprising conduit and a vacuum pump and programmed to remove gas from the adsorption zone undergoing pressure decrease equalization, evacuation and purging for the duration of these steps;

(e) fluid communication means connecting the outlets of said adsorption zones comprising conduit and a flow control valve and programmed to provide fluid communication between said outlets for the duration of the pressure equalization step;

(f) first fluid communication means connecting the outlets of said adsorption zones to said oxygen-enriched gas collection means comprising conduit and a flow control valve and programmed to provide fluid communication between the adsorption zone undergoing backfill and said oxygen-enriched gas collection means for the duration of said backfill step;

(g) second fluid communication means connecting the outlets of said adsorption zones to said oxygen-enriched gas collection means comprising conduit and a flow control valve and programmed to provide communication between the adsorption zone undergoing purging and said oxygen-enriched gas collection means for the duration of said purging step; and (h) control means to perform the programmed steps in (a) and (c)-(g).

24. Apparatus as defined in claim 23 wherein said adsorption columns contain zeolite material of about 8-35 mesh.

25. Apparatus as defined in claim 24 wherein said zeolite material is in the form of beads or pellets having a particle size of between 12 and 20 mesh.

* * * * *